UNITED STATES PATENT OFFICE.

CAMILLO C. CITO, OF IRVINGTON, NEW JERSEY.

PROCESS FOR THE SMELTING OF SILVER-NICKEL-COBALT-ARSENIC ORES.

949,059. Specification of Letters Patent. Patented Feb. 15, 1910.

No Drawing. Application filed October 13, 1909. Serial No. 522,476.

*To all whom it may concern:*

Be it known that I, CAMILLO CLEMENT CITO, a subject of the Grand Duke of Luxemburg, residing at Irvington, in the county of Essex and State of New Jersey, have invented a certain new and useful Improvement in Processes for the Smelting of Silver-Nickel-Cobalt-Arsenic Ores, of which the following is a specification.

The invention is a process for the smelting of Canadian or other ores which contain, besides silver, considerable quantities of nickel, cobalt, and especially arsenic. Generally, such ores run as follows: silver 300 to 10,000 ounces to the ton; nickel and cobalt 10 to 30%; arsenic 5 to 40%; lead none.

In carrying out my process I proceed as follows: The ore is smelted in a reverberatory furnace without any preliminary treatment, such as roasting, etc. I add to said ore a percentage of copper, preferably equal to two thirds of that of the nickel and cobalt and at least the same as that of the arsenic, and not less in amount than the silver. Thus I may put in 20 per cent. of copper, but if there is 25 per cent. of arsenic present, the copper percentage should be increased to 25 per cent. If the silver present amounts to a certain number of ounces per ton, the amount of copper should not be less. Besides the copper the necessary quantity of usual fluxes is to be added. Only two products result from the smelting operation—

1. An alloy containing, besides copper, all the silver, nickel and cobalt, and nearly all the arsenic in the ore treated. This is tapped from the furnace directly into molds.

2. A slag containing a very low percentage of silver, nickel and cobalt.

The alloy which forms the principal product may be sold commercially, and is especially adapted for subsequent treatment, electrolytically, in accordance with the process devised by me and set forth in my application, Serial No. 522,475, filed simultaneously herewith. The slag can be used to advantage as flux in the blast furnace, where the last traces of the metals can be easily recovered.

It is to be noted that I here smelt silver-nickel-cobalt-arsenic ore in the presence of copper only, (besides the usual fluxes) and that in this particular, my process differs essentially from other processes in which, instead of copper, lead is used, and whereby under normal conditions are produced lead, speiss, matte and slag, all of which products contain a larger or smaller amount of silver and hence require separate treatment.

I claim:

1. The process of smelting silver-nickel-cobalt-arsenic ore free from lead, which consists in smelting said ore in the presence of copper.

2. The process of smelting silver-nickel-cobalt-arsenic ore free from lead, which consists in smelting said ore in the presence of a percentage of copper at least the same as that of the arsenic and not less in amount than the silver.

In testimony whereof I have affixed my signature in presence of two witnesses.

CAMILLO C. CITO.

Witnesses:
 GERTRUDE T. PORTER,
 MAY T. MCGARRY.